United States Patent Office 3,485,920
Patented Dec. 23, 1969

3,485,920
ANALGESIC COMPOSITIONS OF ASPIRIN
AND PECTIN
William A. Bender, Bloomfield, N.J., assignor to General
Foods Corporation, White Plains, N.Y., a corporation
of Delaware
No Drawing. Continuation-in-part of application Ser. No.
350,558, Mar. 9, 1964. This application June 12, 1967
Ser. No. 645,506
Int. Cl. A61k 27/00
U.S. Cl. 424—235                     6 Claims

ABSTRACT OF THE DISCLOSURE

An analgesic composition containing aspirin and pectin is provided wherein the aspirin/pectin ratio may be from 1 to 2 to 1 to 15, by weight. The composition may be administered to warm blooded animals in palatable, controlled dosage form to afford, for example, temporary relief of minor aches and pains resulting from the common cold or "flu." Sustained release with a resultant minimizing of gastrointestinal distress may be provided by the composition.

CROSS-REFERENCE TO RELATED APPLICATIONS

This application is a continuation-in-part of my copending application, Ser. No. 350,558, filed Mar. 9, 1964, and now abandoned.

BACKGROUND OF THE INVENTION

This invention relates to a novel analgesic composition and to a method of using the same. More particularly, this invention relates to a new analgesic composition comprising aspirin and pectin and to a method of administering the composition, in controlled dosage form or following a set program of dosage, to warm blooded animals.

Aspirin (acetylsalycylic acid) has been used clinically for many years, principally for its analgesic and antipyretic properties. However, certain drawbacks have been noted with aspirin which seriously limit its utility. For example, the palatability of the conventional aspirin tablet leaves much to be desired. Further, the objective of an aspirin composition which would dissolve slowly in the mouth providing release of aspirin in close contact with the oral mucosa has not been completely realized. Moreover, certain contraindications with, and hypersensitivity to, aspirin have been reported. For example, gastrointestinal distress has been considered a problem among subjects having a history of ulcers who have ingested aspirin at the levels generally recommended for normal therapeutic usage.

SUMMARY OF THE INVENTION

It has now been discovered that a novel analgesic composition suitable for the temporary relief of minor aches and pains resulting from the common cold or "flu," for simple headache, for the temporary relief of toothache, and for like indications, is provided by combining aspirin and pectin at certain critically defined levels, viz., 1 to 2 to 1 to 15, parts by weight. The composition thus affords a means of improving the palatability of aspirin. The composition also allows gradual release of aspirin. The composition, in addition, permits aspirin to be ingested by warm blooded animal subjects with an apparent minimum of gastrointestinal distress resulting. The composition is adapted to be administered to such subjects in controlled dosage form or following a set program of dosage.

DESCRIPTION OF THE PREFERRED EMBODIMENTS

It has been found that pectin with its demulcent quality may alleviate or relieve some of the gastrointestinal distress brought about by ingestion of aspirin. While some relief from indications for which aspirin is used may be noted by employing pectin in combination with aspirin at fairly high levels of aspirin, it appears that gastrointestinal distress is far less significant when a controlled dosage or set program of dosage is followed employing the composition of this invention.

Any one of various pectins, and mixtures, may be used in the composition of this invention. As previously mentioned, the amount of pectin, on a weight basis, may range from about 15 to 1 to 2 to 1 parts of aspirin. Certain pectins such as citrus and apple pectins have been reported by D. W. Wooley of Rockefeller Institute and associates in 1947–49 to have anti-viral activity and such pectins are quite suitable in the aspirin-pectin composition of this invention. Preferably, a dispersible pectin is employed when the aspirin-pectin composition is to be dissolved in water as a means of administering the composition to host warm-blooded animals, including humans. Such dispersible pectins may be an aluminum-calcium pectinate from citrus fruit, similar to the subject of U.S. Patent 2,261,858 (1941) to A. G. Olsen for a dispersible pectin rendered so by a thin coating of aluminum pectinate on each particle. Typically, this type of citrus pectin has a degree of methylation ranging from 60 to 80% by number and preferably about 72–74%; it contains about 2% calcium, range 1.8 to 2.2%; about 0.4% aluminum, range 0.35 to 0.45%; pH about 4.0, range 3.9 to 4.1, in a 1% water dispersion; grade about 230, range 180 to 250; it is miscible with rapid stirring in water without lumping. An aqueous composition prepared from such citrus pectin is a turbid, very viscous dispersion of pH about 4.0, in which the pectin is highly swollen but largely undissolved and which becomes a clear, very viscous solution at pH about 2.0, is more viscous at pH about 3.3 and is a gel at pH about 6.7. These last three pH's approach respectively the pH's of the resting stomach, the small intestine and the duodenum.

The aspirin-pectin composition of this invention may be prepared as troches or lozenges. In such form, the composition may be used locally for temporary relief of minor sore throat pain due to colds or the "flu." The aspirin and pectin may be combined and further reduced to a powder, admixed with other ingredients and then compressed into troches having the desired size and shape on a tablet press. Lozenges may be prepared by admixing aspirin and pectin with a liquid binder such as corn syrup, sugar syrup, honey, or the like, together with flavor, color, edible acid, additional sweetener, and similar conventional lozenge ingredients and then cast. The size and shape of the troches and lozenges are dependent upon the time of release intended for the aspirin and pectin components. Thus, local therapy as well as therapy by sustained release thereby providing absorption with a minimum amount of gastrointestinal distress may be achieved by employing the aspirin-pectin composition of this invention in such form.

If desired, the aspirin and pectin composition of this invention may also be prepared as a free-flowing powder which is adapted to be dissolved or dispersed in water and ingested as by drinking. The aspirin and pectin components may thus be admixed with sweeteners, such as sugars, flavors, starches, colorants, edible acids and other conventional pharmaceutical ingredients and later ground to desired particle size in order to insure uniform admixture and blending of the materials of the composition.

Further, it may be advantageous to prepare the aspirin-pectin composition of this invention in the form of an aqueous solution or dispersion.

The aspirin-pectin composition may comprise from about 0.5 to 5.0% of the solution or dispersion.

Honey may be utilized to lightly flavor and slightly sweeten the mixture and this effect may be obtained by other suitable materials like cane sugar, corn sugar, brown sugar, or synthetic sweeteners and flavors.

Sodium bicarbonate or other mild edible base may be utilized to increase the speed of solution of the aspirin in the mixture and to prevent a slight but somewhat objectionable aftertaste. The amount of bicarbonate or base will generally be that amount adequate for solubilizing for if too much is used, the viscous sol, because of pH rise, may lightly gel on standing. If the aspirin-pectin composition were to be produced and bottled for use, the purchaser would be informed that the aspirin is to be nearly neutralized and without an excess of sodium bicarbonate or edible base that would raise the pH of the pectin sol appreciably and certainly not above about pH 5.5–6.0.

The following examples are illustrative of the invention, but are not intended to be exhaustive nor restrictive.

EXAMPLE I

An aspirin-pectin throat lozenge is prepared by blending and later casting the following:

| Ingredients | Grams/Lozenge | Percentage |
| --- | --- | --- |
| Sugar, granulated | 1.8585 | 74.34 |
| Corn Syrup (81.1% solids) | .3820 | 15.28 |
| Pectin | .1500 | 6.00 |
| Aspirin, U.S.P. (1.25 grains) | .0810 | 3.24 |
| Citric acid | .0240 | 0.96 |
| Flavor, lemon | .0040 | 0.16 |
| Color, FD and C Yellow #5 | .0005 | 0.02 |
|  | 2.5000 | 100.00 |

The lozenge as formulated may be used as needed by adult humans for temporary relief of minor sore throat due to colds by allowing the lozenge to dissolve slowly in the mouth. For children (ages 6 to 12), one lozenge as needed for temporary relief of minor sore throat due to colds may be taken and repeated every half hour as needed up to ten lozenges per day.

EXAMPLE II

An aspirin-pectin powder is prepared by dry blending the following ingredients. The powder is later packaged on conventional pouch-making apparatus.

| Ingredients | Grams/Pouch | Percentage |
| --- | --- | --- |
| Sugar | 27.11 | 90.366 |
| Flavor, honey | .80 | 2.667 |
| Flavor, lemon | .50 | 1.667 |
| Citric acid | .40 | 1.333 |
| Pregelatinized potato starch | .40 | 1.333 |
| Pectin | .35 | 1.167 |
| Aspirin, U.S.P. (2.5 grains) | .17 | .567 |
| Vitamin C | .12 | .400 |
| Eucalyptol powder (20% Eucalyptol) | .10 | .333 |
| Caramel | .05 | .167 |
|  | 30.00 | 100.000 |

The contents of the pouch are added to one cup of hot water for use by adult humans and one-half the contents are added to one cup of hot water for use by children. The dose may be repeated hourly if necessary.

EXAMPLE III

An aqueous solution or dispersion of the aspirin-pectin composition is prepared as follows:

| Ingredients | Total weight, grams | Dry solids, grams |
| --- | --- | --- |
| 1½ cups water, at 236 g./8-fl. oz. cup, about | 314.7 | 0.0 |
| 1 5-grain tablet aspirin, at average 0.404 g./tablet | 0.404 | .404 |
| 1 very small pinch sodium bicarbonate, about | .2 | .2 |
| 1½ level measuring teaspoons pectin (10% moisture content) at average 2.92 g./teaspoon | 4.38 | 3.94 |
| 1 tablespoon honey, about 15 ml. x 1.4117 g./ml. (standard tables), 80% solids and 16.94 g. honey solids, about | 21.18 | 16.94 |
| Total calculated weight and solids, in grams | 340.86 | 21.48 |

To a suitable vessel are added 1⅓ cup warm water, 1 (5-grain) tablet of aspirin, a very small amount of baking soda, and 1½ level measuring teaspoons of aluminum calcium pectinate with vigorous stirring. (This pectin has the property of mixing with water without lumping if beaten in.) Then added and stirred in a tablespoonful of honey. The dosage was 1 tablespoonful every half-hour for 6 hours, then every hour till bedtime and at least once and if possible 2 or 3 times during the night. Next day every hour; the third day 3 hourly doses. The mix may be made up again as needed, taking about 5 minutes to prepare.

The solids content is 21.48/340.86, about 6.30%, and 1 ml. at 20 degrees C. weighs 1.0231 grams (standard sugar tables). The tablespoon dose, or about 15 ml., weighs 15×1.0231 g. or about 15.3 grams; and there are about 340.9/15.3 or 22 tablespoonful in a mix. In practice this is not quite attained because the viscous sol slightly overfills the spoon so that about 18 to 20 tablespoonful are obtained. Consequently, the amounts received in a single dose may be estimated as about ⅛ of the total pectin and aspirin contained in each mix. Thus, the pectin per dose is 4.38 g./18 or about 0.24 g. of about 1/12 of a teaspoon; and the aspirin is 5 grains/18 or ⅛ of a 5-grain tablet when one tablet is used and ⅑ of a 5-grain tablet when two tablets are used.

It is also possible to compare these amounts with the amounts and method previously used by the applicant employing 1 tablet of aspirin and ½ teaspoon of pectin taken in a mixture with water about 4 times per day. Thus, the single dose of pectin was 6 times larger and of aspirin 9 to 18 times larger. By another comparison the aspirin dosage generally therapeutically recommended is "1 or 2 tablets with water every 3 or 4 hours, 5 or 6 times daily as required" or 5 to 10 tablets per day versus 1 to 2 tablets per day by the present mixture and method.

The one 5-grain tablet of aspirin, for those not notably sensitive to aspirin, may be increased to two tablets without noticeably affecting gastrointestinal distress symptoms. As an example of non-irritation, a case of a volunteer with a duodenal ulcer who had had severe vomiting due to overindulgence and who, 9 days later, was taken with a severe head cold may be cited. Prompt relief was afforded this subject using the one-tablet mixture and dosage with no apparent ulcer symptoms during the treatment.

It is somewhat surprising that quick relief of minor aches and pains due to the common cold or "flu" results from these minute doses taken often according to a controlled dosage regimen and the set plan of medication. It seems to show that there is more to the aspirin-pectin composition and the method than the singular effect of its compounds.

I claim:
1. An analgesic composition comprising aspirin and pectin in which the ratio of aspirin to pectin is 1 to 2 to 1 to 15, parts by weight.
2. A composition as in claim 1 in which said pectin is aluminum-calcium pectinate.
3. A composition as in claim 1 further comprising sodium bicarbonate and a sweetening agent.
4. A composition as in claim 1 in lozenge form.
5. A composition as in claim 1 in powderous form.
6. A composition as in claim 1 in the form of an aqueous solution.

References Cited

UNITED STATES PATENTS

| | | |
|---|---|---|
| 2,211,485 | 8/1940 | Zimmerman _____ 167—57 |
| 2,261,858 | 11/1941 | Olsen _____ 260—210 |
| 3,069,321 | 12/1962 | Broh-Kahn. |

OTHER REFERENCES

Chem. Abstracts, vol. 41, p. 1759C (1947).

ALBERT T. MEYERS, Primary Examiner

S. J. FRIEDMAN, Assistant Examiner

U.S. Cl. X.R.

424—361